United States Patent Office 3,283,920
Patented Nov. 8, 1966

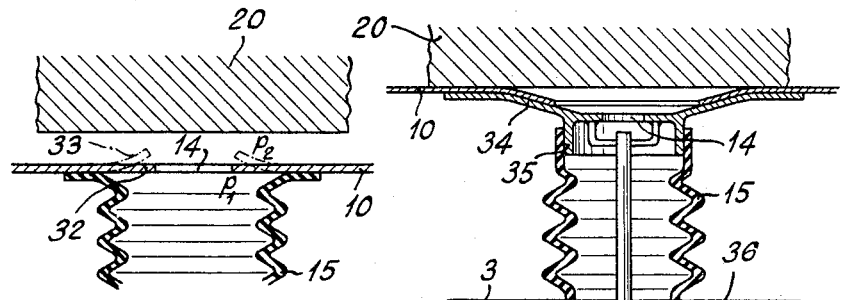
FIG. 4
FIG. 5
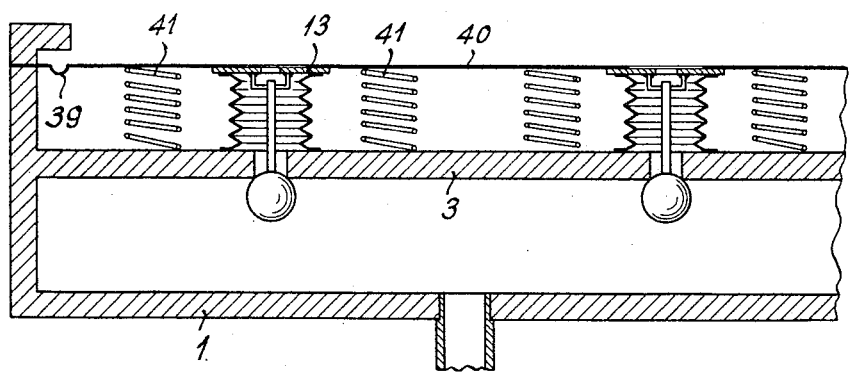
FIG. 6
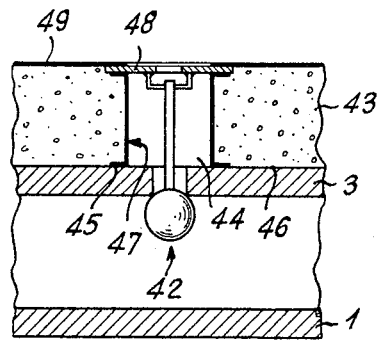
FIG. 7

3,283,920
INFRASTRUCTURE ELEMENT FOR AN INSTALLATION FOR CONVEYING OBJECTS BY PNEUMATIC FLOATING
Max Schonfelder, Petit-Lancy, Geneva, and Donald S. C. Rodgers, Meyrin, Geneva, Switzerland, assignors to Melksham Spencer Limited, Melksham (Wiltshire), England
Filed Aug. 18, 1965, Ser. No. 480,653
Claims priority, application Switzerland, Aug. 18, 1964, 10,793
10 Claims. (Cl. 214—1)

This invention relates to pneumatic conveyors along which conveyed objects travel on a film of gas supplied through underlying valved openings.

In one form of conveyor of this type, in which the valves are controlled by the conveyed objects themselves, the valve members are formed by spheres which project slightly above the glide surface. The valves are opened by the conveyed objects which engage and depress the projecting portions of the spheres, thereby releasing compressed gas. The latter, generally air, forms beneath each object a carrier film of gas which keeps the conveyed object off the glide surface thus preventing it from rubbing on the later and enabling the object to be displaced by pneumatic floating. But because each object, in the course of its progression, successively bumps against the projecting spheres, which constitute the mechanical members controlling the opening of the valves, it receives an impact each time it comes into contact with these control members, thereby causing, during its progression, an uncontrollable and undesirable rolling and pitching motion and moreover rendering the conveyor installation noisy. Furthermore, when a conveyed object has a recessed underface (a bell shaped object, for example), the valves located opposite the recess close. Only those valves that are opposite the portion of the object resting on the element remain operative and since this portion can have a small area, the resulting gas output may be insufficient to clear the object off the glide surface.

It has also been proposed to provide conveyors in which the opening of the valves is controlled by the pressure prevailing within the carrier film as such without there being any mechanical contact between the transported objects and the control members of the valves. These conveyors thus have a distinct advantage over the previously referred to construction, but their shortcoming lies in the creation of the carrier film. In the absence of an object on the element, there is no outflow from the valved openings. The outflow must therefore be artificially initiated when an object is laid on one of these conveyors, the same applies when the latter are rendered inoperative by an interruption of their compressed gas supply, even if they remain loaded with objects. Thus, when the supply of compressed gas is restored, for example at the beginning of a working day, the gas outflow must be artificially induced for a carrier film to reform beneath object left lying on such a conveyor at the end of the preceding day.

An object of the invention is to provide infrastructure elements which, when assembled, form a gas film conveyor from which the drawbacks of the above-described conveyors are eliminated.

The present invention accordingly provides an infrastructure element for gas film conveyor for conveying objects by pneumatic floating, said element comprising a hollow base adapted to be supplied with compressed gas and having a top wall formed with a plurality of spaced gas passages therethrough; a valve associated with each of said passages to control the flow of gas therethrough; a mattress overlaying said top wall and having a normally smooth and gas impervious glide path forming upper surface spaced from said top wall and recuperatively deformable through pressure applied thereon, and a plurality of rigid portions, each having an aperture, located opposite said passages and positioned adjacent said upper surface thereby to move with said surface when siad surface is deformed in the vicinity thereof; and a plurality of gas impervious deformable conduits extending between said top wall and said rigid portions to provide fluidtight communication between each of said passages and the aperture of the oppositely located rigid portion; each of said valves having a valve member normally closing the associated passage and a control member secured to said valve member and to the oppositely located rigid portion through the intermediate deformable conduit.

For a better understanding of the invention and to show how it may be carried into effect, the same will now be described by way of example with reference to the accompanying drawings, in which:

FIGURE 4 is an explanatory view, in section;

FIGURE 5 shows, in section, modified valve construction for an element according to the invention; and FIGURES 6, 7, 8 and 9 are partial cross-sections of four other embodiments of the element according to the invention.

Figure 1:
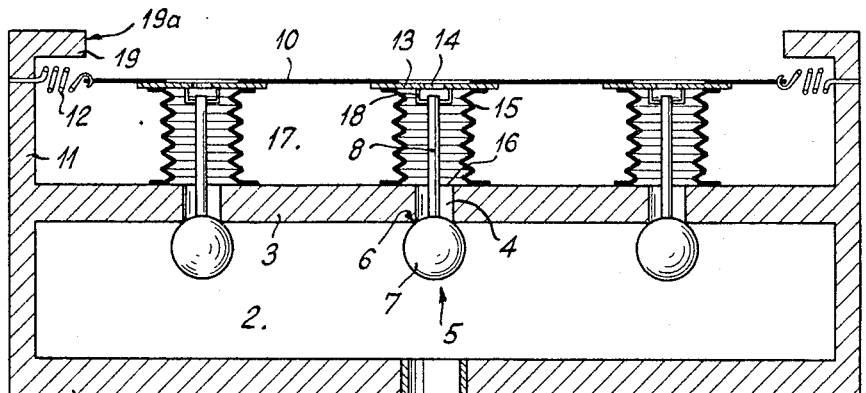
FIGURE 1 shows, in cross-section, a first embodiment of the element according to the invention.

The element shown in FIGURE 1 comprises a hollow base member 1 having an internal chamber 2 and a top wall 3 formed with passages 4 which are each provided with a valve 5 and which enable chamber 2 to communicate with the atmosphere when the valve is open. Each valve 5 comprises a seat 6 formed by the periphery of the associated passage inlet, and a valve member 7 formed by a solid sphere having a diameter greater than that of seat 6. In FIGURE 1, these valves have been shown in the closed position, i.e. with their spherical valve member 7 pressed against seat 6. Each valve 5 is provided with a control member formed by a stem 8 which enables the valve to be opened by moving the sphere 7 away from the seat 6. During operation, chamber 2 is filled with a compressed gas, generally air, which is conveyed from a source, not shown, e.g. a compressed gas generator, by piping 9 opening into chamber 2.

The top wall 3 of base 1 is covered by a sheet 10 of flexible material that is impervious to the gas used for the carrier film. This sheet 10 is secured to upstanding longitudinally extending edges 11 of the base 1 to keep it spaced from the top wall 3. The fastening is carried out in such a manner as to enable this sheet 10 to be deformed at right angles to its plane, for example by means of elastic members 12 secured to edges 11 close beneath an inwardly turned flange 19 defining a guard-rail 19a; in this manner, the flexible sheet 10 forms a deformable mattress. This mattress is provided, opposite each passage 4, with a rigid portion 13. Each rigid portion 13 is formed with an aperture 14, and a plurality of bellows 15, made of gas impervious material, extend between the top wall 3 and the rigid portions 13 to provide fluidtight communication between each passage 4 and each aperture 14 to prevent gas issuing from a passage 4, the associated valve is open, from spreading beneath the mattress, i.e. in the space 17 between the sheet 10 and the top wall 3. The rigid portions 13 each carry a stirrup 18 connected to the stem 8 of the associated valve 5 so that any movement of a rigid portion towards wall 3 will cause the associated valve 5 to open.

Figure 2:
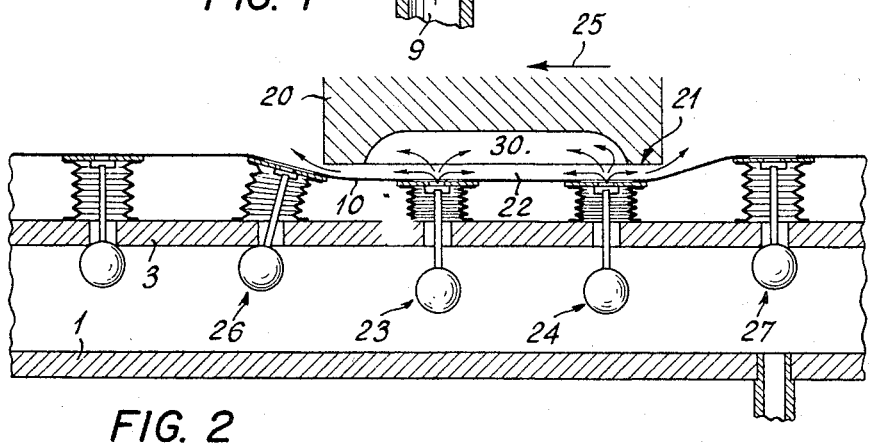
FIGURES 2 and 3 are longitudinal sections of a portion of this first embodiment and relate each to a particular condition of operation.

The operation of a conveyor formed of such infrastructure elements is illustrated by FIGURE 2. When an object 20 is lying on the conveyor and at least one valve is open, the gas escaping through this valve flows between the sheet 10, which is impervious to this gas, and the bottom face 21 of the object which is also assumed to be impervious. There is thus formed between the object and the mattress a carrier film 22 within which prevails a pressure greater than atmospheric. The object 20 thus "floats" on this film 22, which supports the object by bearing in turn on sheet 10. In view of its flexibility, the sheet 10 is consequently deformed in the region of object 20 to come into closer relation with the top wall 3 of base 1. Thus, as soon as film 22 has been formed, it sustains itself because the deformation of the sheet 10 causes the subjacent valves, e.g. valves 23 and 24, to open. When the object 20 moves, e.g. in the direction of arrow 25, the deformation of sheet 10 accompanies it by progressing therewith.

Upon approaching a valve, this deformation causes the latter to open, as may be seen in the case of valve 26, whereas, upon moving away from a valve, the latter closes under the action of the elasticity of sheet 10 and of its fastening means and under the action of the pressure of the gas contained in chamber 2, as may be seen in the case of valve 27. The successive opening and closing of the valves is thus brought about solely by the reaction of the carrier film 22 without there being any direct mechanical contact between the conveyed object 20 and the means for controlling the valves and/or the glide path forming upper surface of the sheet 10.

Figure 3:
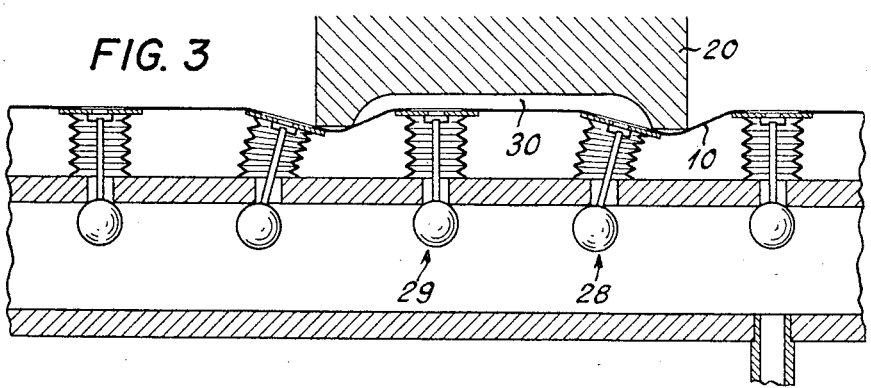

If the supply of compressed gas to the conveyor elements is interrupted, the object 20 comes to a stop and will come to rest directly on the sheet 10 (FIG. 3). The latter is thus subjected to a local deformation similar to that produced by the carrier film 22 of FIGURE 2, and at least some of the subjacent valves remain open, as for example valve 28, while others, such as for example valve 29, can remain closed. Once the supply is restored, the compressed gas escapes through the open valves and forms without any further operations the carrier film. It is therefore not necessary to provide auxiliary means for rendering the loaded conveyor operative.

Also when an object 20 is laid on the element, it first touches and hence deforms the sheet 10, thus causing at least one valve to open, and hence the build-up of the carrier film beneath the object. There are therefore no special operations to be carried out to bring about the formation of the carrier film when the object is laid on the element.

As can be seen, the presence of the mattress formed by the flexible and gas impermeable sheet 10 eliminates the drawbacks of the known air film conveyor constructions, which drawbacks have been briefly outlined above. In particular, the presence in the underface of object 20 of a recess such as the recess 30 does not prevent the subjacent valves from opening, at least under the action of the carrier film 22 as regards valves 23 and 24 (FIGURE 2) and possibly under the action of the residual rigidity of the flexible sheet 10 as regards valve 28 (FIGURE 3), so that the carrier film 22 also exerts its supporting action on the recessed portion of object 20 also.

The rigid portions 13 play a double part. Firstly, they stiffen the edges of apertures 14, which should, in their absence, be formed in the sheet 10 per se, as can be seen in FIGURE 4. But apertures 14 cause a pressure drop in the flow of gas so that the upstream pressure has a value $p_1$ greater than the downstream pressure $p_2$. Since the bellows 15 can only have a diameter greater than that of these apertures, the lip 32 of each aperture 14 would be subjected, if it were not stiffened by a rigid portion 13, to an outwardly directed force which would tend to cause it to take up the position 33 represented in chain-dotted lines, and the formation of the carrier film 22 between sheet 10 and object 20 would consequently be disturbed.

Secondly, the sheet 10 is preferably as flexible as possible, so that only those valves that are subjacent the object 20 may be actuated. But great flexibility is incompatible with infallible opening of the valves towards which the object 20 travels during transport. It is therefore necessary to stiffen the zone of sheet 10 located opposite the valve and to give to this stiffened zone an area such that the force exerted thereon by the carrier film (a relatively low pressure particularly at the front of the moving object) should be able to compensate the force exerted on the valve member 7 by the pressure of the gas supplied to chambers 2 (a relatively high pressure).

If the object 20 is perfectly flat and very smooth, it could happen, when it rests on sheet 10, that it will obturate the apertures 14 of all of the depressed rigid portions and prevent the formation of a carrier film 22. It would thus be appropriate, by way of modification, to give to the rigid portions 13 a dished shape, the concavity being directed towards the object. This is what is shown in FIGURE 5 wherein a rigid portion is formed as a dish 34 which is shaped as an inverted truncated cone of low depth and which is fluidtightly secured at its periphery to the flexible sheet 10, for example by means of an adhesive. This dish 34 is provided with a flange 35 over which is slipped and adhesively secured the upper end of a bellows 15. The lower end of this bellows 15 is fluidtightly secured to the top wall 3 of the base by means of a bush 36 having a shoulder 37 enabling it to be correctly positioned in relation to this top wall so that the periphery 38 of its opening may act as a seat for the valve member 7. The diameter of the flange 35 is less than that of the dish 34 so that, when the object 20 comes to rest on the sheet 10, the downwardly directed force exerted on this dish by the gas leaking into the interior thereof through aperture 14 will be greater than the upwardly directed force exerted on this dish by the pressure of the gas contained within the bellows 15. Under these conditions, the resultant of these two forces depresses dish 34, thereby ensuring infallible opening of the valve.

Obviously, instead of the flexible and impermeable sheet 10 fastened by elastic members 12, use could be made of a sheet made of material that is at the same time flexible, impermeable and stretchable, e.g. rubber. In this case, the elastic members 12 are no longer necessary and the extensible sheet can be directly fastened in rigid manner by clamping beneath flange 19.

Another embodiment, shown in FIGURE 6, makes use of a sprung mattress consisting of a flexible and impermeable sheet 40 kept at a small distance from the top wall 3 of the base 1 by elastic members such as the springs 41. The flexible sheet 40 is provided with rigid portions 13 which are similar to those described above and which actuate in the same manner the valve members of the valves; it is secured to the edge of the base 1 by supple and possibly elastic members 39. The operation of a conveyor using such elements is in all ways similar to that of the conveyor described previously.

In the embodiment illustrated in FIGURE 7, the top wall 3 of base 1 is covered with a full mattress 43 of elastic material, for example foamed rubber (with communicating cells) or alveolar rubber (isolated cells). This mattress is provided with conduits 44 which extend all the way therethrough and which are located opposite the valves 42. This mattress is so secured to the base as to provide fluidtightness at least in the region of the valve outlets. Such securing can be achieved by means of an adhesive, this being represented in FIGURE 7 by the thick line 45, which adhesive prevents issuing gas from escaping into the space 46 between the wall 3 and the lower face of the mattress 43. If the material resorted to is foamed rubber, the wall of the conduit 44 is moreover rendered fluidtight by a gas impervious coating 47, this not being essential if the elastic material is alveolar rubber. Opposite each conduit, the mattress is provided with a rigid portion 48 which is disposed flush with its upper face, and which is embedded therein so as to provide fluidtightness between itself and the conduit 44. Finally, the upper face is rendered both impervious to the gas and smooth by a suitable coating 49 represented by a thick line. As in the embodiments of FIGURES 1 and 6, each rigid portion is connected to the control member of the associated valve. A conveyor constructed with such elements operates in the same way as those described above, the face 49 providing a glide part for objects being transported as the upper surface of the sheet 10 visible in FIGURE 1 and the wall of the conduit 44 playing the part of the bellows 15 while the full portion imparts to the mattress 43 the required elasticity.

Figure 8:
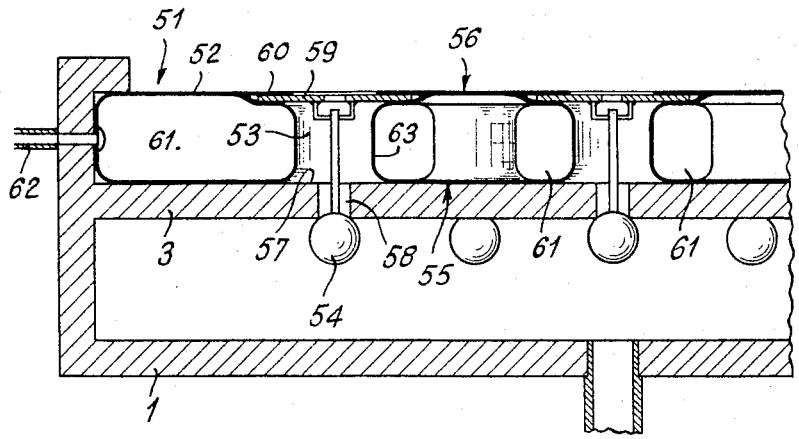

In the embodiment illustrated in FIGURE 8, the mattress is a pneumatic or gas filled mattress 51. The latter is formed by a flexible and impermeable envelope 52 (represented by a thick line) through which extends, opposite each valve 54, a deformable conduit 53. These conduits extend all the way through the mattress, from the lower face 55 of the envelope to the upper face 56, and are defined by a supple and impermeable sleeve 63 fluidtightly connected to these faces. The mattress is secured to the upper wall 3 of the base 1 so as to provide fluidtightness at the periphery 57 of the outlet 58 of each valve. The upper wall 56 is provided with rigid portions 59 located opposite each valve. These rigid portions are so confined as to provide fluidtightness at its periphery 60 to the outflowing gas. The interior of the envelope forms a chamber 61 filled with a gas which is compressed at a low pressure and which imparts to the mattress 51 the required elasticity. It is preferred to establish communication via a pipe 62 between this chamber and a reservoir, not shown, of large volume so that the pressure of this gas may be rendered practically independent of the state of collapse of the mattress 51.

The operation of elements so formed is a conveyor formed of such again similar to those formed with the previously described elements, the upper wall 56 of the envelope playing the part of the flexible sheet 10 and the sleeves 63 playing the part of the bellows 15.

As it is the pressure of the gas enclosed in the envelope 52 which determines the sensitivity of the valves, i.e. the force required to open them, the pressure of the gas is preferably given a value such that the force it exerts on the upper face 56 of the envelope just balances the weight of the latter, including that of its rigid portions, and the weight of the mobile parts of the valves including their control members. It may be useful in some cases to be able to modify this sensitivity freely, and this can be achieved by providing a connection, e.g. pipe 62, linking chamber 61 with means, not shown, enabling the pressure of this gas to be varied. This in particular makes it possible to adjust the sensitivity of the valves.

Provision is also made to divide the single chamber 61 up into several chambers, and to connect each of the latter to independent means for regulating the pressure. It is thus possible to impart to the valves associated with one chamber a sensivity which is different from that of the valves associated with a neighbouring chamber, for example if is required to adapt the gas flow from the valves to the contour of the objects being transported.

Figure 9:
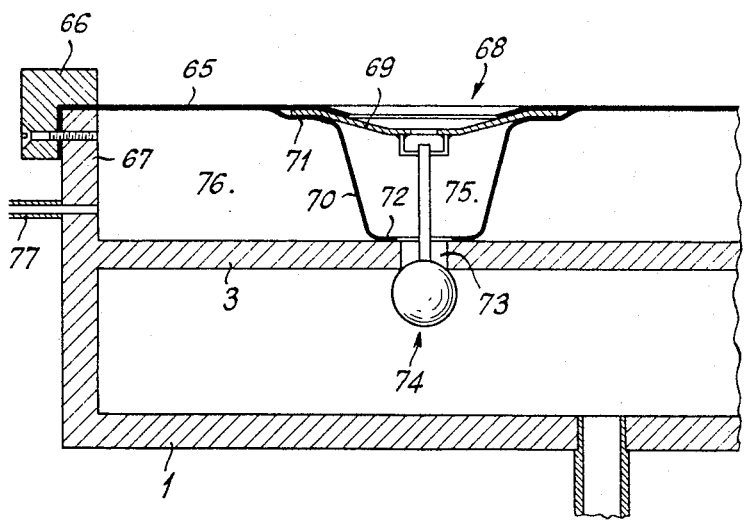

The embodiment illustrated in FIGURE 9 comprises a pneumatic or gas filled mattress whose envelope is formed in mixed manner, in two parts. The upper face is a flexible and impermeable sheet 65 rigidly and fluidtightly secured by means of clamping members 66 on to upstanding edges 67 extending longitudinally of the base 1. The lower face of this envelope is formed by the top wall 3 of base 1. The upper face is formed with holes for receiving the rigid portions which, in FIGURE 9, have the conical shape of the rigid portions 34 (FIGURE 5) described above. Thus the hole 68 (FIGURE 9) is intended to receive the dish 69. The sheet 65 is provided with supple and impermeable sleeves which are fluid- tightly secured thereto by means of an adhesive or by vulcanisation, and which are so disposed as to form along the periphery of the holes circular recesses in which are fitted the rigid portions. Thus, the sleeve 70 which is so disposed as to form the recess 71 in which is fitted the dish 69. The latter is adhesively secured in this recess so as to ensure fluidtightness over its entire periphery. The end 72 of this sleeve 70 is fluidtightly secured around the outlet 73 of valve 74, which is similar to the valves of the embodiments described above, so as to form a bellows separating the space 75 beneath the dish 69 from the space 76 beneath the sheet 65. In this manner, there is obtained a closed impermeable envelope, formed in a mixed manner, its upper face being the flexible sheet 65 and its lower face being formed by the wall 3. The space 76 between the flexible sheet 65 and the wall 3 forms a chamber which is filled with a weakly compressed gas supplied through a pipe 77. The assembly thus forms a gas filled or pneumatic mattress whose upper face 65 is deformable, and the thus constructed element behaves in the same way as the element shown in FIGURE 8.

As will be observed, all of these embodiments have in common the fact that the mobile members of the valves are actuated by the depression of a deformable upper surface of a mattress through the intermediary of rigid portions, either under the action of the carrier layer formed beneath the conveyed object or under the action the conveyed object itself when it rests on this surface, that this deformable surface is restored to its normal rest position, corresponding to the closed state of the valves, by any suitable means for imparting thereto the required elasticity (elastic fastening, tensile sheet, foam mattress, pneumatic mattress), and that means (impermeable and fluidtight conduits) are provided to restrict the escape of issuing gas only to those orifices provided for this purpose in the rigid portion associated with a given valve. The upper surfaces of flexible sheets 10 and 40 of the embodiments illustrated in FIGURES 1 and 6, and the upper surfaces 49, 56 and 65 of the mattresses comprised by the embodiments illustrated respectively in FIGURES 7, 8 and 9, each provide a deformable glide path, the deformation of which accompanies a conveyed object over its entire journey.

We claim:

1. An infrastructure element for a gas film conveyor for conveying objects by pneumatic floating, said element comprising a hollow base adapted to be supplied with compressed gas and having a top wall formed with a plurality of spaced gas passages therethrough; a valve associated with each of said passages to control the flow of gas therethrough; a mattress overlaying said top wall and having a normally smooth and gas impervious glide path forming upper surface spaced from said top wall and recuperatively deformable through pressure applied thereon, and a plurality of rigid portions, each having an aperture, located opposite said passages and positioned adjacent said upper surface thereby to move with said surface when said surface is deformed in the vicinity thereof; and a plurality of gas impervious deformable conduits extending between said top wall and said rigid portions to provide fluidtight communication between each of said passages and the aperture of the oppositely located rigid portion; each of said valves having a valve member normally closing the associated passage and a control member secured to said valve member and to the oppositely located rigid portion through the intermediate deformable conduit.

2. An element as claimed in claim 1, wherein said base has longitudinally extending upstanding edge portions, and said mattress consists of a sheet of gas-impervious flexible material spaced from said top wall and secured to said edge portions by fastening means.

3. An element as claimed in claim 2, wherein said fastening means are elastic.

4. An element as claimed in claim 2, wherein said flexible material is also stretchable.

5. An element as claimed in claim 4, wherein said fastening means are rigid.

6. An element as claimed in claim 2, further comprising a plurality of spaced elastic members carried by said top wall and engaging the underside of said sheet to provide support therefor.

7. An element as claimed in claim 1, wherein said mattress consists of a relatively thick layer of elastic material and rests on said top wall, and wherein said deformable conduits are formed in said mattress.

8. An element as claimed in claim 1, wherein said mattress consists of an envelope of flexible gas-impervious sheet material adapted to be filled with weakly compressed gas and resting on said top wall, and wherein said deformable conduits are formed in said mattress.

9. An element as claimed in claim 1, wherein said base has longitudinally extending upstanding edges, wherein said mattress consists of a sheet of gas-impervious flexible material spaced from said top wall and fluidtightly secured to said edges to define between said sheet, said top wall, said deformable conduits and said edges a chamber adapted to be filled with weakly compressed gas.

10. An element as claimed in claim 1, wherein said rigid portions have centrally dished parts, and wherein said deformable conduits have a cross-section less than that of said dished parts.

References Cited by the Examiner
UNITED STATES PATENTS

| | | | |
|---|---|---|---|
| 1,792,286 | 2/1931 | Curry et al. | 302—29 |
| 2,785,928 | 3/1957 | Hanson | 302—29 |
| 3,235,098 | 2/1966 | Emrick. | |

ANDRES H. NIELSEN, *Primary Examiner.*

EVON C. BLUNK, *Examiner.*